May 7, 1963 J. E. SWIGART 3,088,327
ACCESSORY DRIVE MECHANISM
Filed Feb. 10, 1961 2 Sheets-Sheet 1

VACUUM

INVENTOR.
John E. Swigart
BY
R. L. Spencer
ATTORNEY

May 7, 1963 J. E. SWIGART 3,088,327
ACCESSORY DRIVE MECHANISM
Filed Feb. 10, 1961 2 Sheets-Sheet 2
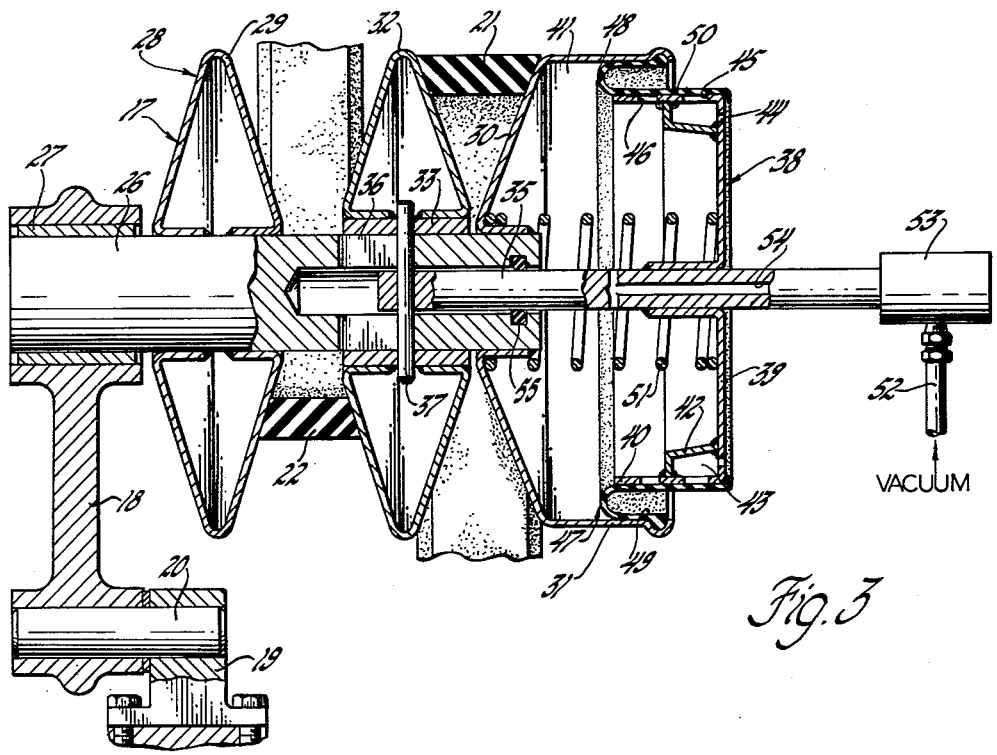
Fig. 3
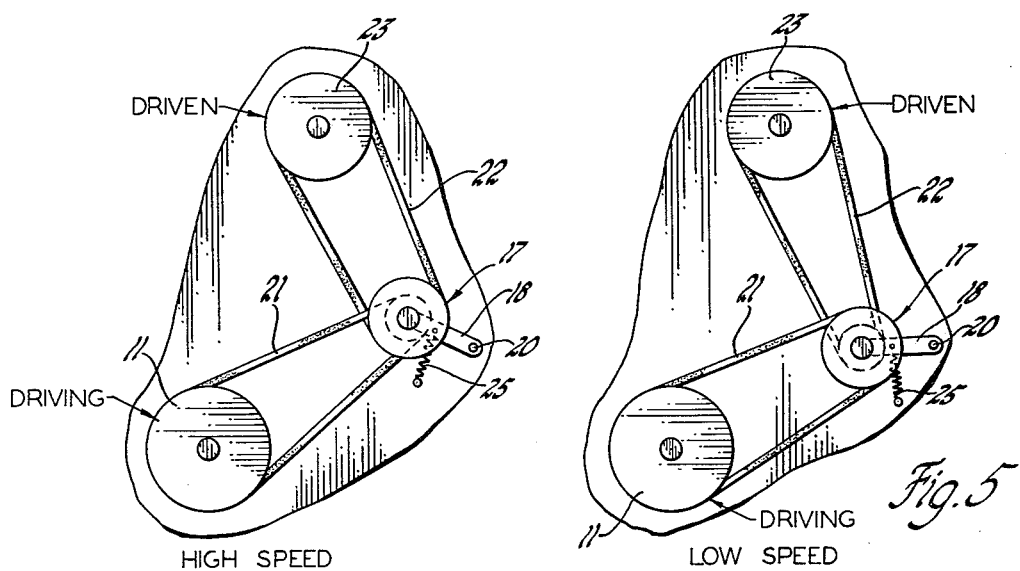
Fig. 4   HIGH SPEED
Fig. 5   LOW SPEED
INVENTOR.
John E. Swigart
BY
C. L. Spencer
ATTORNEY

United States Patent Office 3,088,327
Patented May 7, 1963

3,088,327
ACCESSORY DRIVE MECHANISM
John E. Swigart, Warren, Mich., assignor to General Motors Corporation, Detroit, Mich., a corporation of Delaware
Filed Feb. 10, 1961, Ser. No. 88,441
10 Claims. (Cl. 74—230.17)

This invention relates to a variable speed drive mechanism and more particularly to a variable ratio belt drive mechanism particularly adapted for driving engine accessories of an internal combustion engine, such as the fan, generator, air conditioning compressor, power steering pump and the like.

An object of this invention is to provide a variable ratio drive mechanism for driving engine accessories of an internal combustion engine automatically operable to vary the speed of rotation of the accessories with respect to engine speed in response to variation of engine vacuum.

Another object of this invention is to provide a variable ratio drive mechanism for driving engine accessories of an internal combustion engine automatically operable to drive the accessories at a relatively high speed of rotation with respect to the speed of rotation when the engine vacuum is realtively high and to decrease the speed of rotation of the accessories with respect to engine speed in response to a decrease in engine vacuum.

A further object of this invention is to provide a variable ratio drive mechanism for driving engine accessories of an internal combustion engine automatically operable to vary the speed of rotation of the accessories with respect to engine speed in response to changes in engine vacuum and incorporating centrifugal responsive means operable to limit the maximum speed of rotation of the accessories.

These and other objects and advantages of this invention will be apparent from the following specification and claims in conjunction with the drawings in which:

FIGURE 3 is a sectional view through the variable ratio pulley illustrating the pulley in its low speed position.

FIGURE 4 is a schematic end view of the variable ratio pulley and its pivotal mount illustrating the position of the pulley and its pivotal support when the pulley is conditioned for high speed drive of the accessories.

FIGURE 5 is a schematic end view of the variable ratio pulley and its pivotal support illustrating the position of the pulley and its support when the pulley is conditioned for low speed drive of the accessories.

Figure 1:
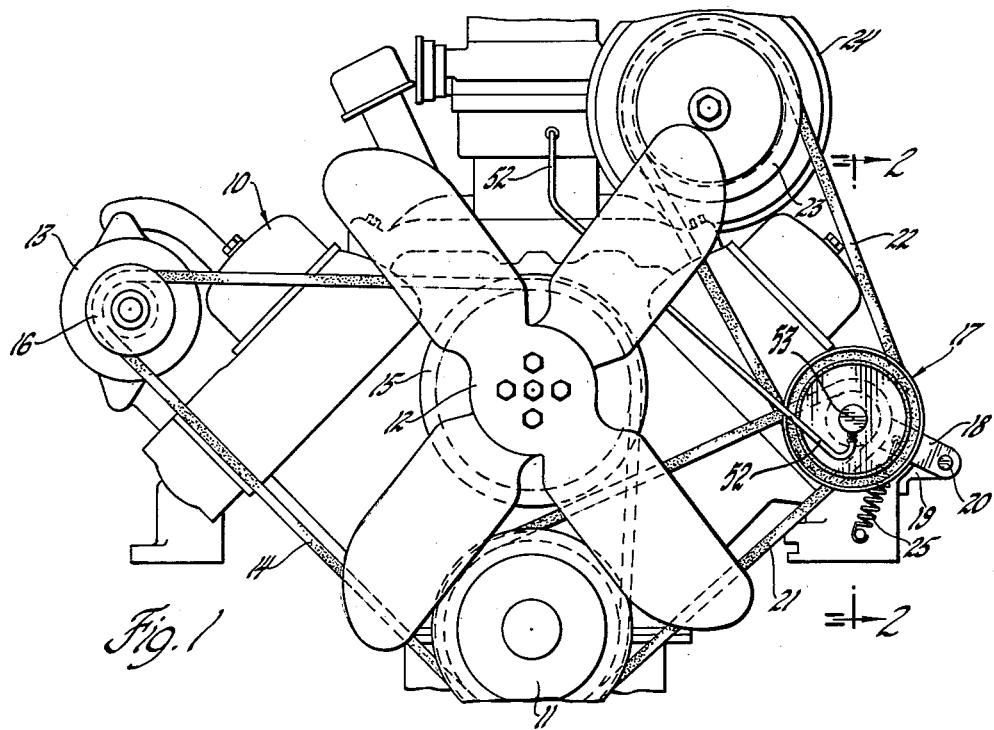
FIGURE 1 is an end elevation of a vehicle engine showing a fan, generator and power steering pump and the pulley and belt arrangement for driving the same.

Referring to FIGURE 1 there is shown an internal combustion engine 10 having a crankshaft driven double sheave pulley 11, a fan 12 and a generator 13 driven by a belt 14 running on pulley 11, a fan pulley 15 and a generator pulley 16. It will be apparent that the fan 12 and a generator 13 will be driven at a constant drive ratio with respect to engine speed. A variable ratio pulley 17 is supported for rotation on an arm or bracket 18 pivotally supported on engine bracket 19 by means of a pin 20. Engine driven pulley 11 drives variable ratio pulley 17 by means of a belt 21 and pulley 17 drives a pulley 23 on power steering pump 24 by means of a belt 22. A spring 25 permits limited rotation of bracket 19 with respect to bracket 19 and retains the belts in tension without slippage in the pulleys.

Figure 2:
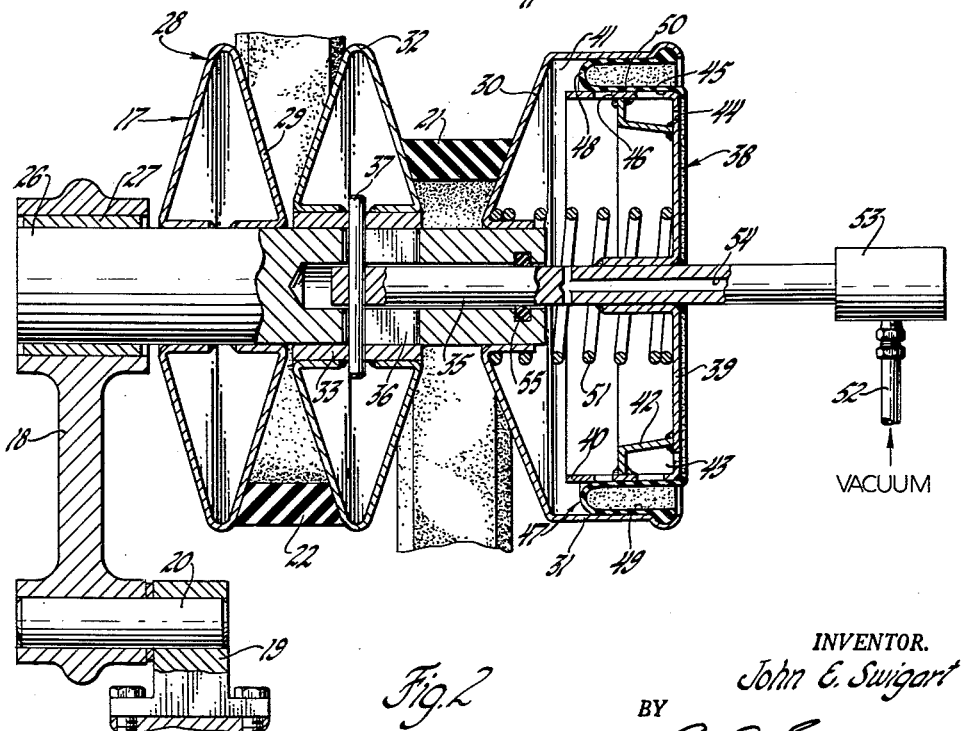
FIGURE 2 is a sectional view through the variable ratio pulley illustrating the pulley in its high speed position.

In FIGURE 2 the variable ratio drive pulley 17 is shown in detail, the pulley 17 being supported upon a countershaft 26 rotatably supported in bracket 18 by means of a bushing 27. The variable speed pulley 17 includes a double conical end member 28 having a conical face 29 and a conical end member 30 fixed to countershaft 26 for rotation therewith, the conical surface 29 facing conical surface 30. A cylindrical extension 31 extends axially from the outer extremity of conical surface 30. A double conical member 32 is disposed between end members 28 and 30 for axial shifting with respect to the end members, the member 32 being fixed to a bushing 33 slidably supported on countershaft 26. Countershaft 26 is drilled axially to receive a shift rod 35 and is slotted at 36. A pin 37 carried by shift rod 35 extends through bushing 33 such that the rod 35, bushing 33 and conical member 32 are all axially movable as a unit on countershaft 26, the slot 36 permitting axial motion of pin 37 with respect to countershaft 26. Engine driven power input belt 21 fits between conical member 32 and end cone 30 and power delivery belt 22 fits between cone 32 and end member 28 as shown. The drive ratio is changed by moving shift rod 35 and center cone axially with respect to countershaft 26.

A push rod header 38 fixed to push rod 35 includes a radially extending flange 39 and an axially extending cylindircal wall 40 carried by flange 39 and extending into and spaced from cylinder portion 31 on cone surface 30, the push rod header 38 together with cone member 30 form a chamber 41 therebetween. An annular L-shaped channel 42 having one end secured to flange 39 and the other end secured to cylindrical wall 40 forms an annular chamber 43 between the header and channel. Openings 44, 45 and 46 are provided in flange 39 and cylindrical portion 40 as shown. A flexible U-shaped seal 47 is disposed in the space between cylindrical surface 31 and cylindrical surface 40 with the base 48 of the U-shaped seal disposed inwardly adjacent cone surface 30 and the side walls 49 and 50 parallel and adjacent to surfaces 31 and 40 respectively. A spring 51 seated upon end member 30 and upon flange 39 of push rod header 38 yieldably biases the header 38, push rod 35 and cone 32 to the right-hand position illustrated in FIGURE 3. A pipe 52 connected to a source of vacuum such as the engine intake manifold as shown in FIGURE 1 is connected to chamber 41 through a rotating seal 53 and a passage 54 in push rod 35.

In the operation of a motor vehicle it has been found to be advantageous to vary the speed of rotation of the accessories with respect to the speed of the engine such that the accessories are driven at a relatively high speed when the engine speed is slow and at relatively decreasing speeds as the engine speed increases. It has also been found to be advantageous to limit the maximum speed of rotation of the accessories to a predetermined speed. Such operation provides increased accessory capacity when the vehicle is operating at a relatively slow speed and reduces noise, accessory wear, and saves fuel when the engine is operated at relatively high speed. These advantageous results are automatically and inexpensively obtained by the arrangement described herein.

With the carburetor throttle valve closed the vacuum in chamber 41 will be relatively high such that header 38, push rod 35 and double cone 32 will be moved to the left against the action of spring 51 to the high speed position illustrated in FIGURE 2 wherein cone 32 is spaced relatively far to the left with respect to cone 30 and relatively close to cone surface 29. Power input belt 21 will ride adjacent the base of its pulley sheaves and power delivery belt 22 will ride near the outer periphery of its sheaves. The pump 24 driven by belt 22 will therefore rotate at a relatively high speed of rotation with respect to engine speed. It will readily be understood that the engine vacuum will vary in accordance with changes in engine speed, throttle setting and load on the engine, but is highest with the engine carburetor throttle valve in its closed or engine idle position. As the speed of the engine is increased by opening the engine throttle the vacuum decreases, permitting spring 51 to move the header 38, rod 35 and cone member 32 towards its low speed drive position illustrated in FIGURE 3. In this condition of operation belt 21 rides in its pulley near the outer periphery of the pulley and belt 22 rides in the pulley adjacent the axis of rotation thereof. With this condition of operation the pump 24 will be rotated at a relatively low speed of rotation with respect to that of the engine. Thus, depending upon the position of cone 32 axially with respect to cones 30 and 29, the pump 24 may be driven faster than, at the same speed as or slower than the speed of the engine.

In shifting of drive ratio the differences in pulley center distance are taken up by mounting the variable ratio pulley on the pivoted arm 18. The position of arm 18 and the variable ratio pulley 17 with respect to pulley 11 and pulley 24 when the variable ratio pulley is conditioned for high speed drive of pulley 24 is shown in FIGURE 4. In like manner, the position of arm 18 and variable ratio pulley 17 when conditioned for low speed drive is illustrated in FIGURE 5, the spring 25 acting upon arm 18 to yieldably bias the pulley 17 towards its low speed position.

In order to limit the maximum speed of rotation of the driven accessories, centrifugally responsive means are provided whereby vacuum chamber 41 may be connected to atmosphere as well as to the engine manifold vacuum such that the effect of vacuum in chamber 41 is limited when engine speed becomes excessive. Flexible seal 47 is arranged such that the wall 50 normally overlies seal slot 46 and vent slot 45 so that these slots are blocked off from each other by the flexible seal 47. Vacuum in chamber 41 acting upon wall 50 tends to retain the flexible seal in close contact with cylindrical surface 40. As the speed of rotation of the engine and consequently the speed of rotation of the cylindrical members 31 and 40 increases, centrifugal force acting upon seal 47 causes wall 50 to tend to fly radially outwardly to establish communication between slots 45 and 46. This permits air to enter chamber 41 by way of openings 44, slots 45 and slots 46 to reduce the effective vacuum in chamber 41. While chamber 41 remains connected to the source of vacuum at all times, air is bled into chamber 41 to reduce the effective vacuum in chamber 41. Spring 51 is therefor able to move header 38, push rod 35 and cone 32 to the right or towards the slow speed position to cause belt 22 to be driven more slowly, or at a lower drive ratio whenever the engine speed exceeds a predetermined speed. The seal 47 not only permits axial motion of member 38 with respect to member 30 while maintaining a seal for chamber 41 when engine speeds are not excessive, but also constitutes a centrifugally responsive device effective to limit maximum speed of rotation of the accessories when engine speed becomes excessive by permitting air to enter chamber 41 at such excessive speed. With the reduced vacuum in chamber 41, spring 51 expands to shift the ratio towards the low speed ratio.

While the pump 24 alone is illustrated as being driven at variable ratio as determined by engine vacuum in chamber 41, it will be understood that any other one accessory such as the fan 12, or generator 16, may be driven at such variable ratio or that all engine accessories may be simultaneously driven at such variable ratios. This could be simply accomplished by driving all accessories from an additional countershaft and by driving such additional countershaft by means of belt 22.

The vacuum controlled double variable sheaves pulley provides for automatic change of drive ratio of the engine accessories in such manner that the accessories are driven at relatively high speed at high engine vacuum and at relatively low speed at low engine vacuum. This provides relatively fast accessory drive when the engine throttle is closed and relatively slow drive of the accessories as the engine throttle is opened. Thus, with the engine at idle the accessory speed is increased relative to engine speed. As the engine throttle is opened the accessory speed decreases relative to engine speed. When the engine speed and speed of rotation of the variable sheave pulley exceeds a predetermined speed, seal 50 permits air to enter chamber 41 to reduce the speed of rotation of the accessories relative to engine speed. This limits the maximum accessory speeds when the engine speed exceeds a predetermined speed. FIGURE 3 shows the extreme low speed position which is reached with little or no vacuum in chamber 41. This condition is typical of wide open engine throttle operation or part throttle operation at speeds above the opening point of seal 47 wherein chamber 41 is connected to atmosphere.

Assuming the device is operating with the header 38 in its high speed position as illustrated in FIGURE 2 and is accelerated to a speed of rotation such that centrifugal force acting upon seal 50 causes the seal to open, atmospheric pressure is permitted to enter chamber 41 by way of openings 44, chamber 43, slots 45 and slots 46. It will be apparent that there are provided a series of slots 45 and 46 through cylindrical wall 40 spaced from each other and disposed around the circumference of the cylindrical wall. Also, a series of openings 44 are provided in end wall 39 for connecting chamber 43 to atmosphere. Seal 47 under all conditions of operation and all axial positions of header 38 overlies seal slot 46. The purpose of the seal slot 46 is to provide a radial inward component of force which must be overcome by centrifugal force in order to admit air to chamber 41. In order to reach the full high speed position, slot 46 must be completely closed by seal 47. Speed regulation is then accomplished by the interaction of a series of factors including engine manifold vacuum which is variable, variable pulley speed, and the shape and location of slots 46. Vacuum in chamber 41 acting on the undersurface of seal 47 through slot 46 tends to cause seal 47 to block off slot 45 from slot 46 whereas centrifugal force tends to throw surface 50 of seal 47 radially outwardly to connect slot 45 to slot 46. When surface 50 is forced outwardly from the external surface of cylindrical wall 40 due to centrifugal force acting on surface 50, air from chamber 43 is permitted to pass through slot 45, through the space between surface 50 and wall 40 and into chamber 41 through slot 46. This loss of vacuum in chamber 41 permits spring 51 to move header 38, push rod 35 and cone 32 to its right-hand position as shown in FIGURE 3, or to its low speed position wherein the accessories are driven at a relatively slow speed with respect to engine speed.

An O ring seal 55 disposed between countershaft 26 and push rod 35 prevents leakage of air along the push rod into chamber 41.

I claim:

1. A variable speed drive for driving an accessory of an internal combustion engine comprising a fixed diameter V-pulley driven by the engine and a fixed diameter pulley connected to said accessory, a double V-pulley having spaced conical end members fixed against axial motion, and a double coned member disposed between said end members and movable axially with respect to said end members, belts connecting the opposite halves of said double V-pulley to said fixed diameter pulleys, respectively, an axially movable header rotatable with said double V-pulley and forming with one of said end members a chamber adapted to receive vacuum at one end of said double V-pulley, means connecting said header to said double coned member whereby said double coned member and said header are axially movable as a unit, means connecting said vacuum chamber to a source of variable vacuum, spring means operable on said header for yieldably opposing the effect of vacuum in said chamber, passage means for admitting atmospheric pressure to said chamber, a flexible seal disposed between said one end member and said header, said seal having a surface thereof subject to vacuum in said chamber and normally effective to block off said chamber from atmosphere, said surface being movable in response to centrifugal force to connect said chamber to atmosphere through said passage means.

2. A variable speed drive for driving an accessory of an internal combustion engine comprising a fixed diameter pulley driven by said engine and a fixed diameter pulley rotatable at the speed of rotation of said accessory, a double V-pulley having spaced conical end members fixed against axial motion and a double coned member disposed between said end members and axially movable with respect to said end members, belts connecting the opposite halves of said double V-pulley to said fixed diameter pulleys, respectively, an axially movable header forming with one of said end members a chamber adapted to receive vacuum, means connecting said chamber to said engine as a source of variable vacuum, means connecting said header to said double coned member for axial motion therewith as a unit, spring means operable upon said header for positioning said header and double coned member to establish relatively slow speed drive of said accessory, the vacuum in said chamber being operable upon said header to move said header against the action of said spring means to position said double coned member to increase the speed of rotation of said accessory with increase in vacuum in said chamber, passage means for connecting said chamber to atmosphere, and a flexible seal for controlling the admission of atmospheric pressure to said chamber, said seal having a surface thereof subjected to vacuum in said chamber for normally blocking off said chamber from atmosphere and movable in response to centrifugal force to connect said chamber to atmosphere through said passage means.

3. A variable speed drive for driving an accessory of an internal combustion engine comprising a fixed diameter pulley driven by said engine and a fixed diameter pulley for driving said accessory, a double V-pulley having spaced conical end members fixed against axial motion and a double coned member disposed between said end members and axially movable with respect to said end members, belts connecting the opposite halves of said double V-pulley to said fixed diameter pulleys, respectively, an axially movable header forming with one of said end members a chamber, means connecting said chamber to said engine as a source of variable vacuum, means connecting said header to said double coned member for rotation therewith and for axial motion therewith as a unit, spring means operable upon said header for positioning said double coned member to establish relatively slow speed drive of said accessory, said header and double coned member being movable axially in response to increase in vacuum in said chamber to increase the speed of rotation of said accessory, and centrifugally controlled means comprising a flexible member disposed between said header and one of said end members normally effective to block off said chamber from atmosphere and responsive to speed of rotation of said header for connecting said chamber to atmosphere to limit the speed of rotation of said accessory.

4. A variable speed drive for driving an accessory of an internal combustion engine comprising a fixed diameter pulley driven by said engine and a fixed diameter pulley for driving said accessory, a double V-pulley having spaced conical end members fixed against axial motion and a double coned member disposed between said end members and axially movable with respect thereto, belts connecting the opposite halves of said double V-pulley to said fixed diameter pulleys, respectively, an axially movable header forming with one of said end members a chamber, means connecting said chamber to said engine as a source of variable vacuum, passage means adapted to connect said chamber to atmosphere, a seal between said header and one end member normally effective to block off said passage means, means connecting said header to said double coned member for axial motion as a unit therewith, means yieldably biasing said header and double cone member axially to establish relatively slow speed of rotation of said accessory with respect to the speed of rotation of said engine, said header being movable axially in response to increase in vacuum in said chamber to position said double cone member to increase the speed of rotation of said accessory with respect to engine speed, said seal being movable in response to a predetermined speed of rotation of said header to open said passage means to permit said chamber to be connected to atmosphere to thereby permit said biasing means to move said header axially to reduce the speed of rotation of said accessory with respect to the speed of rotation of said engine.

5. A variable speed drive for driving an accessory of an internal combustion engine comprising a fixed diameter pulley driven by said engine and a fixed diameter pulley for driving said accessory, a double V-pulley having spaced conical end members fixed against axial motion and a double coned member disposed between said end members and axially movable with respect thereto, belts connecting the opposite halves of said double V-pulley to said fixed diameter pulleys, respectively, an axially movable header forming with one of said end members a chamber, a push rod connecting said header to said double coned member for axial movement as a unit, means connecting said chamber to said engine as a source of variable vacuum including a passage in said push rod, means including passage means and a flexible seal between said header and said one cone member for controlling the admission of atmospheric pressure to said chamber, said seal including a surface responsive to vacuum in said chamber for normally blocking off said chamber from atmosphere and movable in response to centrifugal force to connect said chamber to atmosphere, spring means yieldably biasing said header, said push rod and said double coned member axially in one direction to establish relatively slow speed rotation of said accessory with respect to engine speed, said header being movable axially in the opposite direction in response to increase in vacuum in said chamber to position said double coned member to increase the speed of rotation of said accessory with respect to engine speed in response to increase in vacuum in said chamber.

6. A variable speed drive for driving an accessory of an internal combustion engine comprising a fixed diameter pulley driven by said engine and a fixed diameter pulley for driving said accessory, a double V-pulley having spaced conical end members fixed against axial motion and a double coned member disposed between said end members and axially movable with respect thereto, belts connecting the opposite halves of said double V-pulley to said fixed diameter pulleys, respectively, an axially movable header forming with one of said end members a first chamber, means connecting said first chamber to said engine as a source of variable vacuum, means connecting said double coned member to said header for axial motion therewith as a unit, said header and said one end member having spaced axially extending walls formed thereon, means carried by said header forming a second chamber connected to atmosphere, an opening in said axially extending wall of said header connecting said second chamber to the space between said walls, a second opening in said axially extending wall of said header connecting said first chamber to the space between said walls, a flexible seal in the space between said walls cooperating with said openings normally effective to block off said second chamber from said first chamber, spring means yieldably biasing said header to establish relatively slow drive of said accessory with respect to engine speed, said header being movable in response to increased vacuum in said first chamber to increase the speed of rotation with respect to engine speed, and said seal being movable in response to predetermined centrifugal force to connect said second chamber to said first chamber through said first-mentioned slot to reduce the effective vacuum in said first chamber.

7. A variable speed drive for driving an accessory of an internal combustion engine comprising a fixed diameter pulley driven by said engine and a fixed diameter pulley for driving said accessory, a countershaft, a double V-pulley having spaced conical end members carried by said countershaft fixed against axial motion on said countershaft and having a double coned member carried by said countershaft disposed between said end members and axially movable with respect thereto, belts connecting the opposite halves of said double V-pulley to said fixed diameter pulleys, respectively, a push rod carried by said countershaft and axially movable with respect thereto, a header forming with one of said end members a chamber adapted to be evacuated, said push rod being connected to said double coned member and said header such that said double coned element, said push rod and said header are axially movable as a unit, means connecting said chamber to said engine as a source of variable vacuum including a passage through said push rod, spring means yieldably biasing said header axially to establish relatively slow speed rotation of said accessory with respect to engine speed, said header being movable axially in response to increase in vacuum in said chamber to increase the speed of rotation of said accessory with respect to engine speed, means including passage means for admitting atmospheric pressure to said chamber and controlled by a U-shaped seal disposed between one of said end members and said header, said U-shaped seal having one free end thereof secured to said one end member and the other free end thereof secured to said header, said seal presenting a side wall extending axially and normally effective to block off said chamber from atmosphere, said side wall being movable in response to centrifugal force to connect said chamber to atmosphere through said passage means.

8. A variable speed drive for driving an accessory of an internal combustion engine comprising a fixed diameter pulley driven by said engine and a fixed diameter pulley for driving said accessory, a countershaft, a double V-pulley having spaced conical end members carried by said countershaft fixed against axial motion on said countershaft and having a double coned member supported upon said countershaft between said end members and axially movable with respect thereto, belts connecting the opposite halves of said double V-pulley to said fixed diameter pulleys, respectively, a push rod slidable axially in said countershaft, a header forming with one of said end members a chamber adapted to be evacuated, said double coned member and said header each being fixed to said push rod for axial motion therewith as a unit, a passage connected to said engine as a source of variable vacuum, means connecting said passage to said chamber including a rotating seal carried by said push rod and a passage in said push rod, means for connecting said chamber to atmosphere including second passage means through said header and a flexible seal having one wall thereof subjected to vacuum in said chamber and normally contacting said header for blocking off said chamber from atmosphere, said seal wall being movable with respect to said header in response to centrifugal force to connect said chamber to atmosphere through said second passage means, a spring yieldably biasing said header axially to establish relatively slow drive of said accessory with respect to engine speed, said header being movable axially against said spring in response to increase in vacuum in said chamber to increase the speed of rotation of said accessory relative to engine speed.

9. A variable speed drive for driving an accessory of an internal combustion engine comprising a fixed diameter pulley driven by said engine and a fixed diameter pulley for driving said accessory, a countershaft, a double V-pulley having spaced conical end members fixed against axial motion on said countershaft and having a double coned member supported on said countershaft between said end members and axially movable with respect thereto, belts connecting the opposite halves of said double V-pulley to said fixed diameter pulleys, respectively, a push rod slidable in said countershaft, a header fixed to said push rod and forming with one of said end members a first chamber adapted to be evacuated, means connecting said double coned member to said push rod for axial motion therewith, said header and said one end member each having an axially extending wall portion, a channel member carried by said header forming with said header a second chamber, an opening in said header connecting said second chamber to atmosphere, a vent slot in the axially extending wall of said header, a flexible seal carried by said axially extending wall portions normally effective to block off said vent slot, means connecting said first chamber to said engine as a source of variable vacuum, spring means yieldably biasing said header axially to establish relatively slow speed of rotation of said accessory, said header being movable axially in response to increase in vacuum in said chamber to increase the speed of rotation of said accessory, said seal being movable in response to a predetermined speed of rotation of said header to connect said second chamber to said first chamber to reduce the effective vacuum in said first chamber.

10. A variable speed drive for driving an accessory of an internal combustion engine comprising a fixed diameter pulley driven by said engine and a fixed diameter pulley for driving said accessory, a countershaft, a double V-pulley having spaced conical end members fixed against axial motion on said countershaft and having a double coned member supported on said countershaft between said end members for axial motion with respect thereto, belts connecting the opposite halves of said double V-pulley to said fixed diameter pulleys, respectively, a push rod slidable in said countershaft, a header fixed to said push rod and forming with one of said end members a first chamber adapted to be evacuated, means connecting said double coned member to said push rod for axial motion therewith, said header and said one end member each having spaced axially extending wall portions thereon, means carried by said header forming a second chamber connected to atmosphere, a first opening in the axially extending wall portion of said header connecting said second chamber to the space between said axially extending wall portions, a second opening in the axially extending wall portion of said header connecting said first chamber to the space between said axially extending wall portions, a flexible seal in the space between said axially extending wall portions normally operative to block off said second chamber from said first chamber, means connecting said first chamber to said engine as a source of variable vacuum, spring means yieldably biasing said header axially to establish relatively slow speed drive of said accessory with respect to engine speed, said header being movable axially in response to increase in vacuum in said first chamber to increase the speed of rotation of said accessory relative to engine speed, and said seal being effective upon a predetermined speed of rotation of said header to connect said second chamber to said first chamber to decrease the effective vacuum in said first chamber.

References Cited in the file of this patent

UNITED STATES PATENTS

| | | |
|---|---|---|
| 967,166 | Brandt | Aug. 16, 1910 |
| 2,260,798 | Burns | Oct. 28, 1941 |
| 2,732,831 | Dodge | Jan. 31, 1956 |
| 2,916,024 | Dodge | Dec. 8, 1959 |